(12) United States Patent
Kasamatsu et al.

(10) Patent No.: US 8,081,000 B2
(45) Date of Patent: Dec. 20, 2011

(54) EVALUATION METHOD AND EVALUATION APPARATUS FOR EVALUATING BATTERY SAFETY, AND BATTERY WHOSE SAFETY INDICES HAVE BEEN DETERMINED WITH THE SAME

(75) Inventors: Shinji Kasamatsu, Osaka (JP); Hajime Nishino, Nara (JP); Masato Fujikawa, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 988 days.

(21) Appl. No.: 12/027,126

(22) Filed: Feb. 6, 2008

(65) Prior Publication Data

US 2008/0186030 A1    Aug. 7, 2008

(30) Foreign Application Priority Data

Feb. 6, 2007 (JP) ................................ 2007-026741

(51) Int. Cl.
*G01N 27/416* (2006.01)
(52) U.S. Cl. .................... 324/426; 324/431; 320/150
(58) Field of Classification Search .................. 324/426, 324/431, 432; 320/150; 429/51, 421
See application file for complete search history.

(56) References Cited

U.S. PATENT DOCUMENTS 7,336,081 B2    2/2008 Kasamatsu et al.
2005/0253591 A1    11/2005 Kasamatsu et al.
2008/0143337 A1*    6/2008 Fujikawa et al. ............. 324/426

FOREIGN PATENT DOCUMENTS

CN    1697245 A    11/2005
JP    11-102729    4/1999

OTHER PUBLICATIONS

Chinese Office Action issued in Chinese Patent Application No. CN 2008100094412 dated May 15, 2009.

* cited by examiner

*Primary Examiner* — Edward Tso
*Assistant Examiner* — Aaron Piggush
(74) *Attorney, Agent, or Firm* — McDermott Will & Emery LLP

(57) ABSTRACT

The invention provides an evaluation method and an evaluation apparatus with which it is possible to know the safety level of batteries when an internal short circuit occurs through a chemical process, and a battery whose safety level has been determined with the evaluation method and the evaluation apparatus. A battery that has been charged to a predetermined voltage and into which conductive foreign matter has been incorporated is immersed in an electrolyte. The time at which the battery started to dissolve in the electrolyte is determined. Occurrence of an internal short circuit in the battery is detected based on a battery voltage. A time required for occurrence of short circuit is computed based on the above-described dissolution start time and the time of occurrence of the internal short circuit, and then output.

12 Claims, 4 Drawing Sheets

EVALUATION METHOD AND EVALUATION APPARATUS FOR EVALUATING BATTERY SAFETY, AND BATTERY WHOSE SAFETY INDICES HAVE BEEN DETERMINED WITH THE SAME

BACKGROUND OF THE INVENTION

The present invention relates to an evaluation method and an evaluation apparatus for evaluating battery safety, and to a battery whose safety indices have been determined with the evaluation method and the evaluation apparatus. In particular, the invention relates to an evaluation method and an evaluation apparatus for evaluating battery safety at the time of occurrence of an internal short circuit, and a battery whose safety indices have been determined with the evaluation method and the evaluation apparatus.

In the case of evaluating the safety of lithium ion secondary batteries and alkaline dry batteries, for example, one of the items to be evaluated is the exothermal behavior at the time of occurrence of an internal short circuit. The content of the test methods for examining such a behavior is prescribed, for example, by the UL standard for lithium batteries (UL 1642) and a guideline (SBA G1101-1997 "Guideline for Safety Evaluation on Secondary Lithium Cells") from The Battery Association of Japan. Such tests are utilized for the development of various batteries (see e.g., Laid-Open Patent Publication No. Hei 11-102729. In particular, paragraph [0048]).

One of these test methods is the nail penetration test in which a nail is driven through batteries from the side. In this test method, the nail that has penetrated through batteries creates a short circuit portion in the interior of the batteries, and a change, for example, in the battery temperature and the battery voltage that was caused by the Joule heat generating at that short circuit portion is observed. Another test method is the crush test in which batteries are physically deformed using a round bar, a square bar or a flat plate, for example. In this test method, the above-mentioned physical deformation causes a short circuit in the interior of the batteries, and a change, for example, in the battery temperature and the battery voltage that was caused by the short circuit is observed.

The present inventors analyzed the exothermal behavior at the time of occurrence of an internal short circuit with regard to the above-described nail penetration test and crush test. According to the results of the analysis, it was evident that plural locations in the interior of each battery simultaneously experienced a short circuit in these tests. Further, in these tests, it is essential to greatly deform or damage the constituting elements of the electrode group, such as electrodes and a separator, intentionally. As a result, these tests cannot evaluate the battery safety with regard to internal short circuits that occur locally.

Each of the above-described tests examines the exothermal behavior in an internal short circuit that occurs due to a physical cause and that also occurs in a very extreme manner. However, in practice, the battery safety becomes a problem in an internal short circuit that occurs in a manner that is difficult to recognize visually, and such an internal short circuit often occurs through a chemical process. For example, conductive fine foreign matter enters into the interior of batteries, and that foreign matter is dissolved by the electrolyte and then deposited to cause such an internal short circuit. In that case, the thermal behavior cannot be examined by the above-described test methods.

In addition, the safety level, including, for example, "There is no heat generation" or "There is some heat generation" at the time of occurrence of an internal short circuit through the above-described chemical process cannot be known by these tests. It is very important to know such a safety level in connection with the applications of batteries (for example, a low level of heat generation is required for the mobile phone application). For this reason, there is a great demand for an evaluation method that can determine the safety level at the time of occurrence of an internal short circuit for each type of batteries.

Foreign matter may enter into the interior of batteries not only during manufacture of batteries, but also after batteries went onto the market as products. Particularly, from the viewpoint of preventing accidents, it is very important to know the exothermal behavior in the case where entrance of foreign matter has caused an internal short circuit in batteries after they went on the market.

The present invention was made in view of the foregoing problems, and it is an object of the invention to provide an evaluation method and an evaluation apparatus for batteries with which it is possible to know the safety level in the case where foreign matter enters into the interior of batteries, and has caused an internal short circuit through a chemical process. It is another object of the present invention to provide a battery whose safety level is determined by the above-described evaluation method and evaluation apparatus.

BRIEF SUMMARY OF THE INVENTION

In order to achieve the above-described objects, an evaluation method of battery safety according to the present invention is an evaluation method for evaluating safety of a battery including an electrode group including a positive electrode plate, a negative electrode plate and a separator inserted between the electrode plates, the method including the steps of:

charging the battery to a predetermined voltage;

incorporating conductive foreign matter into the charged battery such that the conductive foreign matter is in contact with the positive electrode plate, and not in contact with the negative electrode plate;

immersing the battery into which the conductive foreign matter has been incorporated in an electrolyte to dissolve and deposit the conductive foreign matter, thereby causing an internal short circuit to occur in the battery; and evaluating a exothermal behavior of the battery in which the internal short circuit has occurred, and outputting results of the evaluation as safety indices.

Here, it is preferable the conductive foreign matter comprises a metal or an alloy that dissolves in the electrolyte at a potential lower than a positive electrode potential of the battery in an open circuit, and it is particularly preferable that the conductive foreign matter is at least one metal selected from the group consisting of copper, nickel, zinc, iron and cobalt, or an alloy thereof.

It is preferable that one of the output safety indices is a maximum temperature of the battery at the time of occurrence of the internal short circuit, an amount of heat generation in the battery that is caused by the internal short circuit, or a time required from start of dissolution of the conductive foreign matter in the electrolyte until occurrence of the internal short circuit.

Further, in order to achieve the above-described objects, a battery according to the present invention is a battery that has been manufactured by the same steps as those used for manufacturing a battery whose safety indices have been determined with any of the above-described evaluation methods.

Still further, in order to achieve the above-described objects, an evaluation apparatus for evaluating battery safety according to the present invention is an evaluation apparatus for evaluating safety of a battery including an electrode group including a positive electrode plate, a negative electrode plate and a separator inserted between the electrode plates, the apparatus including:

a container for holding an electrolyte for immersing the battery that has been charged to a predetermined voltage and into which conductive foreign matter has been incorporated such that the conductive foreign matter is in contact with the positive electrode plate, and not in contact with the negative electrode plate;

a dissolution start time determination means for determining a time at which the conductive foreign matter incorporated into the battery started to dissolve in the electrolyte;

a short circuit occurrence detection means for detecting occurrence of an internal short circuit in the battery;

a short circuit occurrence time computation means for computing a time required from start of dissolution of the conductive foreign matter in the electrolyte until occurrence of the internal short circuit, based on a determination result of the dissolution start time determination means and a detection result of the short circuit occurrence detection means;

a heat generation level detection means for detecting a level of heat generation in the battery that is caused by the internal short circuit; and a safety index output means for outputting a computation result of the short circuit occurrence time computation means and a detection result of the heat generation level detection means as safety indices.

Here, it is preferable that the short circuit occurrence detection means detects a voltage change in the battery that is caused by occurrence of the internal short circuit, thereby detecting occurrence of the internal short circuit.

It is preferable that the heat generation level detection means detects a maximum temperature of the battery at the time of occurrence of the internal short circuit as the level of heat generation.

It is preferable that the heat generation level detection means detects an amount of heat generation in the battery that is caused by the internal short circuit as the level of heat generation.

Further, in order to achieve the above-described objects, a battery according to the present invention is a battery that has been manufactured by the same steps as those used for manufacturing a battery whose safety indices have been determined with any of the above-described evaluation apparatuses.

With the evaluation method of the present invention, it is possible to evaluate the battery safety in the case where conductive fine foreign matter enters into the interior of batteries and has caused an internal short circuit through a chemical process. Accordingly, it is possible to evaluate the battery safety in the case where an internal short circuit occurs in a manner that is difficult to recognize visually. It is also possible to know the battery safety in the case where conductive foreign matter enters into the interior of manufactured batteries after they went onto the market and has caused an internal short circuit in the batteries.

Furthermore, according to a more preferable embodiment of the present invention, it is possible to know the safety level for each type and manufacturing method of batteries. This makes it possible to select the type and manufacturing method of batteries in accordance with the purpose of use of batteries. Accordingly, it is also possible to provide more reliable indices for battery users for selecting batteries that are suitable for the purpose of use.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
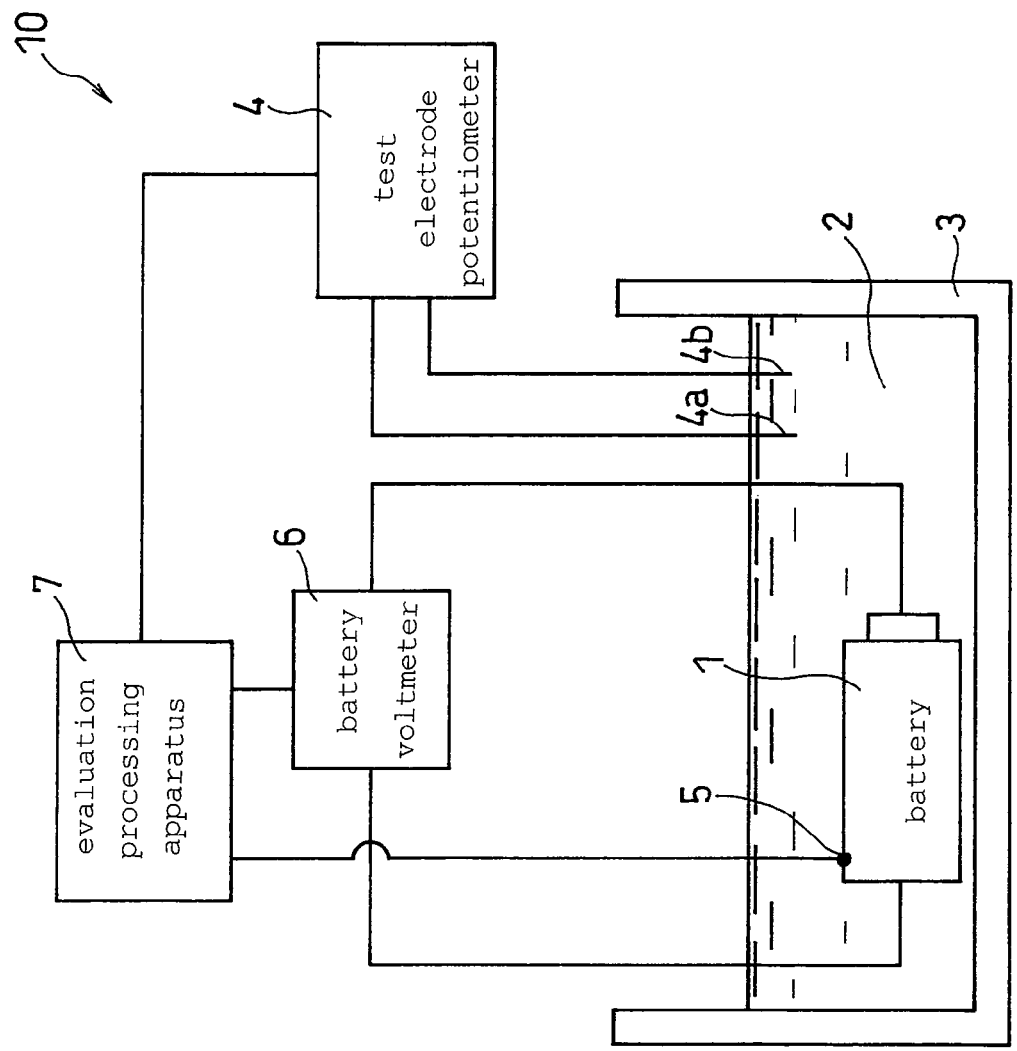
FIG. 1 is a block diagram schematically showing the configuration of a battery safety evaluation apparatus according to an embodiment of the present invention.

The present invention relates to an evaluation method for evaluating safety of a battery including an electrode group including a positive electrode plate, a negative electrode plate and a separator inserted between the electrode plates, the method including the steps of: charging the battery to a predetermined voltage; incorporating conductive foreign matter into the charged battery such that the conductive foreign matter is in contact with the positive electrode plate, and not in contact with the negative electrode plate; immersing the battery into which the conductive foreign matter has been incorporated in an electrolyte to dissolve and deposit the conductive foreign matter, thereby causing an internal short circuit to occur in the battery; and evaluating a exothermal behavior of the battery in which the internal short circuit has occurred, and outputting results of the evaluation as safety indices.

By incorporating the conductive foreign matter into the battery after charging the battery to a predetermined voltage in this way, it is possible to evaluate the exothermal behavior of the battery in the case where an internal short circuit has occurred at a normal use voltage of the battery.

Here, an internal short circuit can also be caused by incorporating the conductive foreign matter into the battery in a manufacturing step such as an electrode group production step in which an electrode group is produced by winding long, band-shaped positive electrode plate, negative electrode plate and separator. This is because the electrode group production step is followed by an electrolyte injection and impregnation step, a step of performing aging under a high-temperature environment and so on, and the dissolution and deposition reaction of the conductive foreign matter is started during such a step. However, in the case where an internal short circuit has been caused in this manner, initial failure such as voltage failure or capacity decrease occurs in the battery, and therefore, the battery cannot be charged to a normal use voltage of the battery. Accordingly, it is not possible to know the exothermal behavior of the battery in the case where an internal short circuit has occurred at a normal use voltage of the battery.

Here, there is no particular limitation with respect to the voltage to which the battery is charged. However, in the case of lithium ion secondary batteries, the voltage is preferably 4.2 V, which is within the normal operating voltage range of the batteries, or 4.3 to 4.4 V, which is the limit voltage regulated by a control circuit, in order to know the safety level of the practically used batteries.

According to the present invention, the battery safety is evaluated using a fully charged battery that has been manufactured in an ordinary process without incorporating conductive foreign matter into the battery during manufacture. More specifically, for example, after disassembling a manufactured battery and incorporating conductive foreign matter into the battery, the battery is reassembled and the safety of the battery is evaluated. This makes it possible to accurately evaluate the battery safety at the time of occurrence of an internal short circuit due to entrance of fine foreign matter, which may occur after batteries went onto the market as products.

The method for incorporating the conductive foreign matter will be described more specifically in the following. The battery is disassembled, and the electrode group is removed from the outer jacket member. Then, the conductive foreign matter is attached to an arbitrary point on the positive electrode plate inside the electrode group, and the electrode group is wound again. At this time, the electrode group needs to be unwound to a position to which the conductive foreign matter is to be attached. Accordingly, there is a risk that the positive electrode plate and the negative electrode plate may react with the moisture in the air. Therefore, this operation is preferably conducted in dry air, or under atmosphere of an inert gas such as nitrogen and argon.

In addition, at least a portion of the positive electrode plate to which the conductive foreign matter is to be attached is exposed to the atmosphere of the work area at this time, so that the electrolyte at that portion is evaporated away. Consequently, the dissolution and deposition reaction of the conductive foreign matter will not proceed. In order to avoid this, according to the present invention, the battery is immersed in the electrolyte to impregnate the conductive foreign matter with the electrolyte. This enables the dissolution and deposition reaction of the conductive foreign matter to proceed.

Furthermore, by determining the safety indices of a battery according to the present invention, it is possible to determine the optimum purpose of use of that battery, and to optimize the design of the application software for operating the devices that use the battery. Here, in practical use, the determined safety indices, for example, can be specified on the product catalog, or directly indicated on the product.

According to the present invention, the above-described conductive foreign matter comprises a metal or an alloy that dissolves in the electrolyte at a potential lower than a positive electrode potential of the battery in an open circuit, and is incorporated into the battery such that the conductive foreign matter is in contact with the positive electrode plate, and not in contact with the negative electrode plate.

Here, more specifically, the conductive foreign matter is at least one metal selected from the group consisting of copper, nickel, zinc, iron and cobalt, or an alloy thereof.

When the conductive foreign matter made of the above-described material is incorporated into the battery in the above-described state, the conductive foreign matter easily dissolves at the positive electrode potential, and is deposited on the negative electrode plate. As a result of this reaction, it is possible to establish electrical conduction between the positive electrode plate and the negative electrode plate, whereby an internal short circuit occurs.

According to the present invention, the above-described safety index is a maximum temperature of the battery at the time of occurrence of the internal short circuit, an amount of heat generation in the battery that is caused by the internal short circuit, or a time required from start of dissolution of the conductive foreign matter in the electrolyte until occurrence of the internal short circuit.

The present invention also relates to a battery that has been manufactured by the same steps as those used for manufacturing a battery whose safety indices have been determined with the above-described evaluation method.

Batteries that are manufactured by the same steps all have a substantially equal safety. Therefore, by manufacturing batteries by the same steps as those used for a battery whose safety indices have been determined with the evaluation method of the present invention, it is possible to ensure the safety of all the manufactured batteries.

Further, the present invention relates to an evaluation apparatus for evaluating safety of a battery including an electrode group including a positive electrode plate, a negative electrode plate and a separator inserted between the electrode plates, the apparatus including: a container for holding an electrolyte for immersing the battery that has been charged to a predetermined voltage and into which conductive foreign matter has been incorporated such that the conductive foreign matter is in contact with the positive electrode plate, and not in contact with the negative electrode plate; a dissolution start time determination means for determining a time at which the conductive foreign matter incorporated into the battery started to dissolve in the electrolyte; a short circuit occurrence detection means for detecting occurrence of an internal short circuit in the battery; a short circuit occurrence time computation means for computing a time required from start of dissolution of the conductive foreign matter in the electrolyte until occurrence of the internal short circuit, based on a determination result of the dissolution start time determination means and a detection result of the short circuit occurrence detection means; a heat generation level detection means for detecting a level of heat generation in the battery that is caused by occurrence of the internal short circuit; and a safety index output means for outputting a computation result of the short circuit occurrence time computation means and a detection result of the heat generation level detection means as safety indices.

Here, the short circuit occurrence detection means detects a voltage change in the battery at the time of occurrence of the internal short circuit, thereby detecting occurrence of the internal short circuit. The heat generation level detection means detects a maximum temperature of the battery at the time of occurrence of the internal short circuit as the level of heat generation, or detects an amount of heat generation in the battery that is caused by occurrence of the internal short circuit as the level of heat generation.

In the following, an embodiment of the present invention will be described with reference to the drawings. FIG. 1 is a block diagram showing an example of a battery safety evaluation apparatus to which a battery safety evaluation method according to the embodiment of the present invention is applied.

An evaluation apparatus 10 shown in FIG. 1 is an apparatus for evaluating the battery safety, in particular, the battery safety at the time of occurrence of an internal short circuit, and includes a liquid container 3 for holding a non-aqueous electrolyte (hereinafter, simply referred to as "electrolyte") 2 in an amount necessary for immersing the entire battery 1 to be evaluated. In addition, the evaluation apparatus 10 includes a test electrode potentiometer 4, a battery temperature sensor 5 for detecting the temperature of the battery 1, and a battery voltmeter 6 for measuring the voltage of the battery 1. Further, the evaluation apparatus 10 includes an evaluation processing apparatus 7 for performing processing relating to the safety evaluation of the battery 1 based on the data output from the test electrode potentiometer 4, the battery temperature sensor 5 and the battery voltmeter 6, and outputting the processing results as safety indices.

Here, the battery 1 may be any of various batteries including primary batteries such as manganese dry batteries, alkaline dry batteries and lithium primary batteries, and secondary batteries such as lead-acid batteries, nickel-cadmium storage batteries, nickel-metal hydride batteries and lithium ion secondary batteries.

Although there is no particular limitation with respect to the electrolyte 2 as long as it is a non-aqueous electrolyte having metal ion conductivity, it is preferable to use an electrolyte having a composition equivalent to that of the electrolyte used for the battery 1.

The test electrode potentiometer 4 is used for measuring the potential difference between a pair of test electrodes (working electrode 4a, counter electrode 4b) that are immersed in the non-aqueous electrolyte 2 simultaneously with the battery 1. The output signal from the test electrode potentiometer 4 is input to the evaluation processing apparatus 7.

Here, the above-described test electrodes may be composed of any materials, as long as a substance that is chemically stable to the electrolyte 2, and that causes a potential difference when immersed in the electrolyte 2 is used for the working electrode 4a and the counter electrode 4b. The working electrode 4a may be formed by metal wire made of stainless steel, nickel, iron, platinum or silver, for example. On the other hand, the counter electrode 4b can be formed by metal wire that is made of lithium, stainless steel, nickel, iron, platinum or silver, for example, and that is different from the metal wire constituting the working electrode 4a.

The battery temperature sensor 5 may comprise, for example, a thermocouple, and be provided in contact with the outer jacket member of the battery 1 so that it can detect the temperature of the battery 1. The output signal from the battery temperature sensor 5 is input to the evaluation processing apparatus 7. The evaluation processing apparatus 7 outputs (for example, displays on a display device or prints out), as a safety index, the maximum temperature of the battery 1 that is detected by the battery temperature sensor 5 at the time of occurrence of an internal short circuit in the battery 1 (safety index output processing).

Here, the battery temperature sensor 5 may be formed by a temperature sensor other than a thermocouple, including, for example, a thermoviewer. The evaluation processing apparatus 7 may calculate the amount of heat generation in the battery 1 at the time of occurrence of an internal short circuit, instead of the temperature, and output the calculated amount of heat generation as a safety index.

Figure 2:
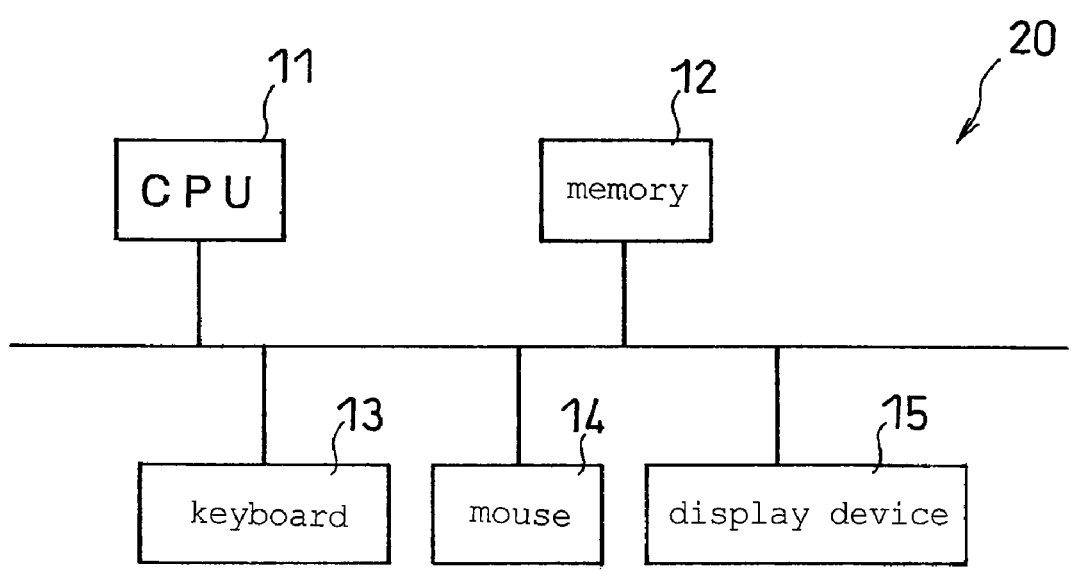
FIG. 2 is a block diagram showing a specific example of the evaluation processing apparatus.

More specifically, the evaluation processing apparatus 7 is constituted by a computer. FIG. 2 shows a schematic configuration of a computer 20 used as the evaluation processing apparatus 7 in a block diagram.

The computer 20 includes a CPU (Central Processing Unit) 11, a memory 12, a keyboard 13, a mouse 14 and a display device 15. The CPU 11 executes various processing relating to the evaluation of the battery safety, such as dissolution start time determination processing, short circuit occurrence recognition processing, short circuit occurrence time computation processing and safety index output processing, according to an evaluation processing program stored in the memory 12. The display device 15 displays the results of the evaluation processing. The keyboard 13 and the mouse 14 are operating tools used by an operator for operating the computer 20 and entering data.

In the following, the various processing executed in the evaluation processing apparatus 7 will be described.

Figure 4:
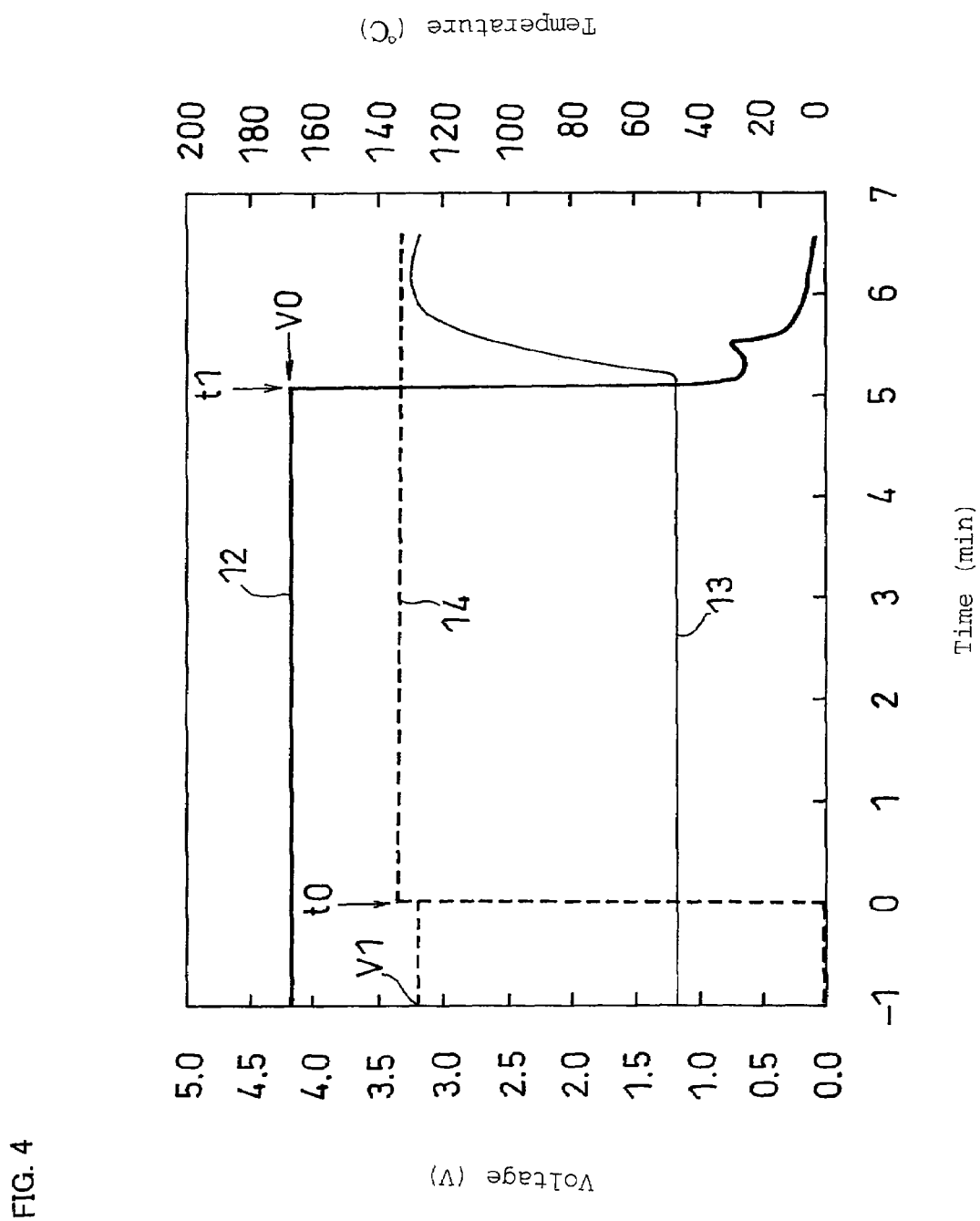
FIG. 4 is a graph showing the change in the battery voltage, the battery temperature and the test electrode potential difference in Example 1.

In the dissolution start time determination processing, as shown in FIG. 4, the impregnation of the conductive foreign matter with the electrolyte 2 is determined to have started when the potential difference (denoted by the broken line 14) between the working electrode 4a and the counter electrode 4b that is measured with the test electrode potentiometer 4 has exceeded a dissolution start determination threshold V1 (time t0). Thus, the dissolution start time of the conductive foreign matter is determined. Here, the dissolution start determination threshold can be set in accordance with the materials of the working electrode 4a and the counter electrode 4b.

In the short circuit occurrence recognition processing, as shown in FIG. 4, an internal short circuit is recognized to have occurred in the battery 1 at a time point t1 at which the voltage (denoted by the solid line 12) of the battery 1 that is measured with the battery voltmeter 6 has rapidly dropped from an initial voltage V0.

In the short circuit occurrence time computation processing, the time required for occurrence of the short circuit is computed from the time difference between the dissolution start time of the conductive foreign matter that is determined by the dissolution start time determination processing and the time of occurrence of the internal short circuit that is recognized by the short circuit occurrence recognition processing.

Figure 3:
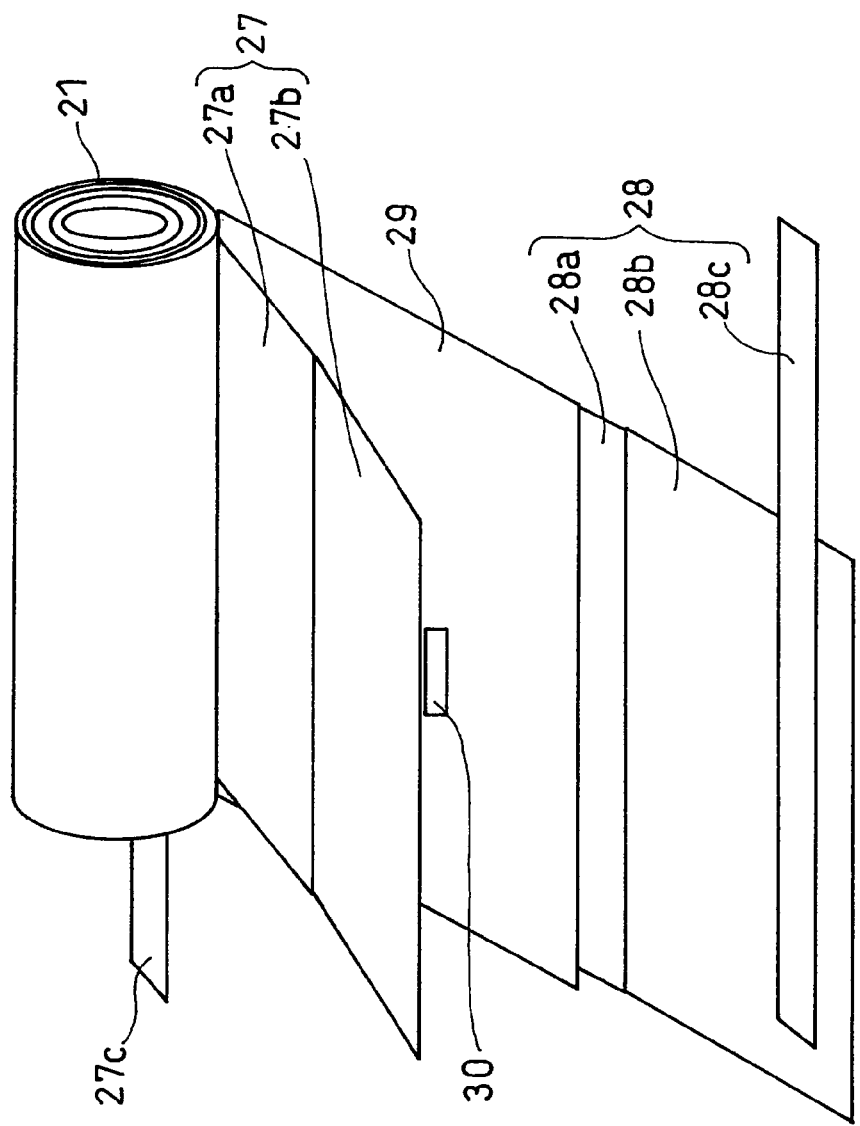
FIG. 3 is a perspective view schematically showing the configuration of the electrode group of a battery to be evaluated.

In the following, the method for incorporating the conductive foreign matter into the battery 1 will be described more specifically. FIG. 3 schematically shows the structure of the electrode group of a cylindrical lithium ion secondary battery, which is an example of the battery 1. The electrode group 21 is formed by winding long, band-shaped positive electrode plate 27, negative electrode plate 28 and separator 29 such that the separator 29 is sandwiched between the positive electrode plate 27 and the negative electrode plate 28.

Here, the positive electrode plate 27 includes a positive electrode current collector 27b and positive electrode material mixture portions 27a formed on both sides of the positive electrode current collector 27b. The negative electrode plate 28 includes a negative electrode current collector 28b and negative electrode material mixture portions 28a formed on both sides of the negative electrode current collector 28b. The respective current collectors of the positive electrode plate 27 and the negative electrode plate 28 are exposed at both longitudinal ends of the electrode plates.

A positive electrode lead 27c made of aluminum is welded to the exposed portion of the positive electrode current collector 27b at the inner side of the electrode group 21. A negative electrode lead 28c made of aluminum is welded to the exposed portion of the negative electrode current collector 28b at the outer side of the electrode group 21.

In the example shown in the drawing, conductive foreign matter 30 is disposed between the current collector-exposed portion of the positive electrode plate 27 at the outer end of the electrode group 21 and the separator 29.

Here, it is necessary to use, as the conductive foreign matter 30, a metal or an alloy that dissolves in the non-aqueous electrolyte at a potential lower than the positive electrode potential of the battery 1 in an open circuit, in order to cause the dissolution reaction of the conductive foreign matter 30 at the positive electrode plate potential, and to deposit the conductive foreign matter 30 on the negative electrode plate. More specifically, it is preferable that conductive foreign matter 30 is at least one metal selected from the group consisting of copper, nickel, zinc, iron and cobalt, or an alloy thereof. When a positive potential is applied to various metals or alloys in an electrolyte, they exhibit a dissolution reaction start voltage unique to each of their materials. This voltage can be known by cyclic voltammetry, which is carried out by immersing, in an electrolyte, various metals or alloys to be examined as a working electrode, metallic lithium as a counter electrode, and a charged negative electrode plate as a reference electrode.

The above-described metals or alloys start to dissolve in a normal use voltage range of non-aqueous electrolyte secondary batteries. These metals or alloys are also main metal species used as components of equipments for fabricating electrodes or manufacturing batteries, so that there is a high possibility that they may enter into batteries during manufacturing. Therefore, it is preferable to select these metals or alloys as the conductive foreign matter 30. The location of incorporation of the conductive foreign matter 30 is not limited to the one shown in FIG. 3, and the conductive foreign matter 30 can be incorporated at an arbitrary location.

Here, the electrode group as shown in FIG. 3 includes the positive electrode plate and the negative electrode plate, as well as the material mixture portions thereof, the exposed portions thereof on which there is no material mixture portion, the welded portions of the leads, a protective tape attachment portion, and so on. Among these, for example, the following can be short circuited. An area between the material mixture portion of the positive electrode plate and the material mixture portion of the negative electrode plate, an area between the exposed portion of the positive electrode plate and the exposed portion of the negative electrode plate, and an area between the exposed portion of the positive electrode plate and the material mixture portion of the negative electrode plate. Particularly, in the case of attaching the conductive foreign matter to the exposed portion of the positive electrode plate, a short circuit portion is formed without the presence of the material mixture of the positive electrode plate, which has low electron conductivity, so that there is a possibility that the short circuit resistance is lowered, causing a large current flow. In this case, abnormal heat generation in the battery that is caused by occurrence of an internal short circuit can be observed. In addition, the exposed portions of the positive electrode plate and the negative electrode plate may be formed, for example, at the outermost part, the innermost part, and ends in the width direction of the electrode plate. The protective tape attachment portion may be disposed, for example, at the welded portions of the leads, and the ends of the material mixtures.

With the evaluation apparatus 10 shown in FIG. 1, it is possible to make evaluation with regard to the battery voltage change and the battery temperature change, and the time required for occurrence of short circuit, based on the relationship with the specifications of the battery 1, the open circuit voltage, the location of internal short circuit occurrence, the ambient temperature, and the size and shape of the conductive foreign matter. Here, the specifications of the battery 1 include the compositions of the positive electrode material mixture and the negative electrode material mixture, the thickness of the positive electrode plate and the negative electrode plate, the material and thickness of the separator and the electrode configuration (differentiation among wound configuration, laminated configuration, and so on).

The specifications of the battery 1 and the location of incorporation of the foreign matter are related to the short circuit resistance. Accordingly, the safety can be evaluated based on the battery voltage and the battery temperature for individual specifications of the battery 1 and individual locations of inclusion of the foreign matter.

The potential difference between the dissolution voltage at which the conductive foreign matter dissolves into the electrolyte and the open circuit voltage of the battery is related to a dissolution rate at which the conductive foreign matter dissolves. Therefore, it is possible to evaluate the above-described safety for each potential difference based on the time required for occurrence of short circuit.

The ambient temperature is related to the dissolution rate at which the conductive foreign matter dissolves in the electrolyte. Therefore, it is possible to evaluate the safety for each ambient temperature based on the time required for occurrence of short circuit.

With regard to the conditions for performing the evaluation method according to the present invention, evaluation is preferably performed at ambient temperature in the working temperature range of the intended batteries. For example, lithium ion secondary batteries are preferably evaluated at ambient temperature of not less than −10° C. and not more than 60° C. More preferably, they are evaluated at ambient temperature of not less than 20° C. and not more than 60° C., since this is closer to the actual use condition.

The size of the conductive foreign matter is related to, for example, the amount of the dissolution and deposition reaction, and the diffusion of the dissolved metal ion. Therefore, it is possible to evaluate the safety for each size of the conductive foreign matter based on the battery voltage change, the battery temperature change and the time required for occurrence of short circuit. In addition, the amount of the conductive foreign matter needs to be at least an amount by which the dissolution and deposition of the conductive foreign matter can cause an internal short circuit. More specifically, the conductive foreign matter needs to have a maximum height that is equal to or larger than the distance between the positive electrode plate and the negative electrode plate.

Although there is no particular limitation with respect to the specific size of the conductive foreign matter, it is preferable that the maximum length is not less than 0.020 mm and not more than 1 mm, considering the loss due to the diffusion of the metal ion during the dissolution and deposition, for example. A maximum length larger than 1 mm is not preferable, since there is a possibility that deformation of the electrodes may increase and an internal short circuit may be caused by physical damage.

The shape of the conductive foreign matter is related to the shape of the resulting conductive material that has been dissolved and deposited, the dissolution rate into the electrolyte, and the short circuit area caused by the conductive material between the positive electrode plate and the negative electrode plate. Therefore, it is possible to evaluate the safety for each shape of the conductive foreign matter based on the battery voltage, the battery temperature and the time required for occurrence of short circuit. Although there is no particular limitation with respect to the shape of the conductive foreign matter, it is preferable that the conductive foreign matter has a shape such that it may be incorporated into batteries in the actual manufacturing process. For example, it is preferable that the conductive foreign matter is spherical, bulky, needle-shaped, flaky, wire-shaped, protruded or L-shaped.

EXAMPLES

Example 1

In the following, the evaluation method of the present invention will be described specifically based on examples.

(1) Production of Positive Electrode Plate

Nickel/manganese/cobalt/lithium oxide ($LiNi_{1/3}Mn_{1/3}Co_{1/3}O_2$) powder having a median diameter of 15 μm was used as a positive electrode active material. An N-methyl-2- pyrrolidone (NMP) solution (#1320 manufactured by KUREHA CORPORATION) containing 12 wt % of polyvinylidene fluoride (PVDF) was used as a binder. Acetylene black was used as a conductive agent, and NMP was used as a dispersion medium.

3 kg of the positive electrode active material, 1 kg of the binder, 90 g of the conductive agent and a proper amount of the dispersion medium were stirred using a double arm kneader to prepare a positive electrode material mixture paste. The positive electrode material mixture paste was applied onto both sides of a band-shaped positive electrode current collector made of aluminum foil having a thickness of 20 μm. The applied positive electrode material mixture paste was dried, and the whole was rolled using a roll to form positive electrode material mixture portions having a total thickness of 180 μm on both sides of the positive electrode current collector. The positive electrode current collector on which the positive electrode material mixture portions were formed was cut to a width (56 mm) that could be inserted into a cylindrical battery case can (diameter: 18 mm, height: 65 mm, inside diameter: 17.85 mm), thereby obtaining a positive electrode plate.

Here, a portion of the positive electrode plate that was located at the innermost part of the electrode group was provided with a current collector-exposed portion, and a lead made of aluminum was welded to that portion. Further, a current collector-exposed portion was provided in about one turn of the electrode group from the end of the material mixture of the positive electrode at the outermost part of the electrode group. Thus, a positive electrode plate was produced.

(2) Production of Negative Electrode Plate

Artificial graphite powder having a median diameter of 20 μm was used as a negative electrode active material. An aqueous dispersion (BM-400B manufactured by ZEON Corporation) containing 40 wt % of modified styrene butadiene rubber particles was used as a binder. Carboxymethyl cellulose (CMC) was used as a thickener. Water was used as a dispersion medium.

3 kg of the negative electrode active material, 75 g of the binder, 30 g of the thickener and a proper amount of the dispersion medium were stirred using a double arm kneader to prepare a negative electrode material mixture paste. The negative electrode material mixture paste was applied onto both sides of a band-shaped negative electrode current collector made of copper foil having a thickness of 20 μm. The applied negative electrode material mixture paste was dried, and the whole was rolled using a roll to form negative electrode material mixture portions having a total thickness of 180 μm on both sides of the negative electrode current collector. The negative electrode current collector on which the negative electrode material mixture portions were formed was cut to a width (57.5 mm) that could be inserted into the above-described cylindrical battery case can, thereby obtaining a negative electrode plate.

Here, the negative electrode material mixture portion provided in an area of the negative electrode plate that was located at the outermost part of the electrode group was 30 mm longer than the positive electrode material mixture portion provided in that area. Further, a current collector-exposed portion having a length of about one turn of the electrode group was provided in that area, and a lead made of nickel was welded to the end of that portion. Thus, a negative electrode plate (N1) was produced.

Additionally, a heat-resistant porous layer was formed on the entire surface of the negative electrode material mixture in the following manner, thereby producing a negative electrode plate (N2).

970 g of alumina (insulating filler) having a median diameter of 0.3 μm, 375 g of BM-720H (NMP solution containing 8 wt % of modified polyacrylonitrile rubber (binder)) manufactured by ZEON Corporation and a proper amount of NMP were stirred using a double arm kneader to prepare a raw material paste. This raw material paste was applied onto the surface of the negative electrode material mixture, and dried under vacuum with a temperature of 120° C. for 10 hours to form a heat-resistant porous layer having a thickness of 0.5 μm. The porosity of the heat-resistant porous layer was 48%. Here, the porosity was determined by calculation from the thickness of the heat-resistant porous layer that was determined by cross-sectional SEM observation, and the amount of alumina present in a certain area of the heat-resistant porous layer that was determined by fluorescent X-ray spectroscopy, the true specific gravity of alumina and the binder and the weight ratio of alumina and the binder.

(3) Assembly of Battery

The above-described positive electrode plate and the negative electrode plate (N1) were wound, with a porous resin film made of polyethylene (Hipore, manufactured by Asahi Kasei Corporation) having a thickness of 20 μm disposed between the electrode plates, thereby producing an electrode group. After the electrode group was inserted into a cylindrical battery case can (diameter: 18 mm, height 65 mm, inside diameter: 17.85 mm) made of nickel-plated iron, 5.0 g of a non-aqueous electrolyte was injected into the battery case can, and the opening of the battery case can was sealed by a lid member, thereby completing a lithium secondary battery having a capacity of 2400 mAh.

Here, a non-aqueous electrolyte in which $LiPF_6$ was dissolved at a concentration of 1 mol/L in a mixed solvent of ethylene carbonate (EC), dimethyl carbonate (DMC) and ethylmethyl carbonate (EMC) was used as the non-aqueous electrolyte. The volume ratio of EC, DMC and EMC in the mixed solvent was 1:1:1.3 wt % of vinylene carbonate (VC) was added to the non-aqueous electrolyte. This non-aqueous electrolyte is referred to as electrolyte S1.

In the above-described manner, a battery (K1) using the positive electrode plate and the negative electrode plate (N1) was fabricated. Next, using the evaluation apparatus 10 according to the embodiment, the safety of the battery (K1) was evaluated as follows.

<Safety Evaluation>

(1) First, the battery was subjected to break-in charge/discharge twice, and subsequently subjected to charge with a current value of 400 mA until the voltage reached 4.1 V (maximum charge period: 7 hours). Thereafter, as an aging step, the battery was stored for seven days under an environment with 45° C.

(2) Thereafter, the battery was subjected to charge under the following conditions:

Constant current charge: current value 1500 mA/end-of-charge voltage 4.25 V

Constant voltage charge: charge voltage 4.25 V/end-of-charge current 100 mA

The battery voltage was determined by measuring the open circuit voltage after completion of charge.

(3) The following operation was performed under a dry air environment with a dew point of not more than −20° C.

The battery that had been charged until the open circuit voltage reached 4.2 V was disassembled. Then, the electrode group was removed, and a part of the outermost part of the electrode group was unwound. Copper wire (dissolution start voltage: 3.6 V) having a diameter of 500 μm and a length of 5 mm was placed between the current collector-exposed portion of the positive electrode and the separator at a position located 5 mm away from the end of the material mixture of the positive electrode toward the outermost part of the electrode group in an area where the current collector-exposed portion of the positive electrode faced the negative electrode material mixture portion. At this time, the length (height) of the copper wire in a direction perpendicular to the electrode plate surface was 500 μm.

<Evaluation Results>

FIG. 4 shows the time-series change in the battery voltage, the battery temperature and the test electrode voltage in Example 1. In FIG. 4, the test electrode potential difference 14 exceeded the threshold V1 at a time 0 minute, and therefore, it can be seen that the dissolution of the conductive foreign matter started at this time point. The battery voltage 12 rapidly dropped at a time 5 minutes, and therefore, it can be seen that the internal short circuit occurred at this time point. Further, the battery temperature 13 rapidly increased after occurrence of the internal short circuit, and reached 125° C. after a time 6 minutes.

The results are shown in Table 1 below.

Example 2

A battery (K1) was fabricated in the same manner as in Example 1. The safety of the battery was evaluated in the same manner as in Example 1, except that copper wire (dissolution start voltage: 3.6 V) having a diameter of 100 μm and a length of 5 mm was used as the conductive foreign matter. The results are shown in Table 1 below.

Example 3

A battery (K1) was fabricated in the same manner as in Example 1. The safety of the battery was evaluated in the same manner as in Example 1, except that copper wire (dissolution start voltage: 3.6 V) having a diameter of 50 μm and a length of 5 mm was used as the conductive foreign matter. The results are shown in Table 1 below.

Example 4

A battery (K1) was fabricated in the same manner as in Example 1. The safety of the battery was evaluated in the same manner as in Example 1, except that zinc wire (dissolution start voltage: 3.1 V) having a diameter of 500 μm and a length of 5 mm was used as the conductive foreign matter. The results are shown in Table 1 below.

Example 5

A battery (K1) was fabricated in the same manner as in Example 1. The safety of the battery was evaluated in the same manner as in Example 1, except that iron wire (dissolution start voltage: 3.8 V) having a diameter of 500 μm and a length of 5 mm was used as the conductive foreign matter. The results are shown in Table 1 below.

Example 6

A battery (K1) was fabricated in the same manner as in Example 1. The safety of the battery was evaluated in the same manner as in Example 1, except that cobalt wire (dissolution start voltage: 3.9 V) having a diameter of 500 μm and a length of 5 mm was used as the conductive foreign matter. The results are shown in Table 1 below.

Example 7

A battery (K1) was fabricated in the same manner as in Example 1. The safety of the battery was evaluated in the same manner as in Example 1, except that the charge voltage was 4.4 V and that nickel wire (dissolution start voltage: 4.3 V) having a diameter of 500 μm and a length of 5 mm was used as the conductive foreign matter. The results are shown in Table 1 below.

Example 8

A battery (K1) was fabricated in the same manner as in Example 1. The safety of the battery was evaluated in the same manner as in Example 1, except that the conductive foreign matter was placed on the positive electrode material mixture at a position located 20 mm inside from the end of the applied positive electrode material mixture at the outermost part of the electrode group, and that copper wire (dissolution start voltage: 3.6 V) having a diameter of 100 μm and a length of 5 mm was used as the conductive foreign matter. The results are shown in Table 1 below.

Example 9

A cylindrical nickel-metal hydride storage battery as shown below was fabricated as a battery for evaluating the internal short circuit.

A hydrogen storage alloy having a composition represented by $MmNi_{3.55}Co_{0.75}Mn_{0.4}Al_{0.3}$ (Mm represents a mixture of rare earth elements) was used. This hydrogen storage alloy was pulverized using a ball mill to obtain powder having an average particle diameter of 24 μm. Then, 100 parts by weight of the hydrogen storage alloy powder, 0.15 parts by weight of carboxymethyl cellulose serving as a thickener, 0.3 parts by weight of carbon black serving as a conductive agent and 0.8 parts by weight of a styrene-butadiene copolymer serving as a binder were mixed with water serving as a dispersion medium to prepare a hydrogen storage alloy paste. The hydrogen storage alloy paste was coated onto punched metal serving as a support member, dried and rolled, followed by cutting, thereby producing a hydrogen storage alloy negative electrode plate.

Next, the positive electrode plate, the negative electrode plate and the separator were wound spirally, with the separator interposed between the positive electrode plate and the negative electrode plate, thereby forming an electrode group. The electrode group was inserted into an SC size battery case, into which an alkaline electrolyte was injected, and thereafter, the top of the battery case was sealed tightly with a sealing plate also serving as a positive electrode terminal, thereby fabricating a nickel-metal hydride storage battery having a nominal capacity of 3000 mAh.

A known paste-type nickel positive electrode plate having a width of 3.5 cm, a length of 26 cm and a thickness of 0.57 mm was used for the positive electrode plate. Nonwoven fabric made of polypropylene in which a hydrophilic group had been added was used for the separator. An electrolyte in which lithium hydroxide was dissolved at a ratio of 40 g/L in a potassium hydroxide aqueous solution having a specific gravity of 1.30 was used as the electrolyte.

<Safety Evaluation>

The battery that had been charged until the open circuit voltage reached 1.45 was disassembled. Then, the electrode group was removed, and a portion of the outermost part of the electrode group was unwound. Copper wire having a diameter of 500 μm and a length of 5 mm was placed between the current collector-exposed portion of the positive electrode and the separator at a position located 5 mm away from the end of the material mixture of the positive electrode toward the outermost part of the electrode group in an area where the current collector-exposed portion of the positive electrode faced the negative electrode material mixture portion. The rest of the evaluation was performed in the same manner as in Example 1. The results are shown in Table 1 below.

Example 10

A cylindrical organic electrolyte primary battery as shown below was fabricated as a battery for evaluating the internal short circuit.

A mixture composed of 80 wt % of manganese dioxide serving as an active material, 10 wt % of Ketjen Black serving as a conductive agent and 10 wt % (solid content) of a PTFE emulsion D-1 (manufactured by DAIKIN INDUSTRIES, LTD.) serving as a binder was packed into expanded metal made of SUS 444 serving as a core member, thereby producing a positive electrode hoop having a width of 44 mm and a thickness 400 μm. After cutting this positive electrode hoop to a length of 165 mm and peeling the mixture from a part of the core member, a positive electrode lead was welded to the positive electrode hoop. Further, at an edge of the positive electrode hoop that would become the outermost end of the positive electrode produced using the hoop in the subsequent winding step, a tape made of an aramid resin was attached such that it extended from a length of 8 mm on the side that would become the inner side after winding over a length of 2 mm on the side that would become the outer side after winding. Thus, a band-shaped positive electrode having a reaction inhibition layer with a length of 6 mm on the inner side of the outermost end thereof was produced.

Meanwhile, lithium foil having a width of 42 mm and a thickness of 150 μm and serving as an active material and a core member was cut to a length of 190 mm, and a negative electrode lead was pressure bonded onto an edge of the lithium foil that would become the outermost end of the negative electrode produced using the lithium foil in the subsequent winding step. The aramid resin tape was attached to the above-mentioned edge to which the lead was pressure bonded, thereby producing a band-shaped negative electrode.

With a microporous polypropylene (PP) film having a thickness 30 μm interposed as a separator between the above-described positive and negative electrodes, the positive and negative electrodes and the separator were spirally wound such that the separator, the negative electrode, the separator and the positive electrode were arranged in this order repeatedly from the outermost side toward the inner side, thereby forming an electrode assembly. The top and bottom of this electrode assembly was sandwiched with an insulating plate, and the whole was inserted into a cylindrical iron battery case having a bottom. Thereafter, an electrolyte in which lithium trifluoromethanesulfonate was dissolved at a concentration 0.5 mol/L in a solvent in which propylene carbonate and 1,2-dimethoxyethane were mixed at a volume ratio of 1:1 was injected into the battery case, and the lid portion was tightly sealed, thereby fabricating a cylindrical organic electrolyte primary battery. The open circuit voltage of this battery was 3.25 V.

<Safety Evaluation>

The thus fabricated battery was disassembled. Then, the electrode group was removed, and a portion of the outermost part of the electrode group was unwound. Copper wire having a diameter of 500 μm and a length of 5 mm was placed between the current collector-exposed portion of the positive electrode and the separator at a position located 5 mm away from the end of the material mixture of the positive electrode toward the outermost part of the electrode group in an area where the current collector-exposed portion of the positive electrode faced the negative electrode material mixture portion. The rest of the evaluation was performed in the same manner as in Example 1. The results are shown in Table 1 below.

Comparative Example 1

A battery (K1) was fabricated in the same manner as in Example 1. The safety of the battery was evaluated in the same manner as in Example 1, except that stainless steel wire (insoluble until the voltage reaches 5.0 V or higher) having a diameter of 500 μm and a length of 5 mm was used as the conductive foreign matter. The results are shown in Table 1 below. In Comparative Example 1, no change in the battery voltage and the battery temperature due to occurrence of the internal short circuit was observed. The results are shown in Table 1 below.

Comparative Example 2

A battery (K1) was fabricated in the same manner as in Example 1. The safety of the battery was evaluated in the same manner as in Example 1, except the charge voltage was 4.2 V and that nickel wire (dissolution star voltage: 4.3 V) having a diameter of 500 μm and a length of 5 mm was used as the conductive foreign matter. The results are shown in Table 1 below. In Comparative Example 2, no change in the battery voltage and the battery temperature due to occurrence of the internal short circuit was observed. The results are shown in Table 1 below.

Comparative Example 3

A battery (K1) was fabricated in the same manner as in Example 1. The conductive foreign matter was incorporated into the interior of the battery in the same manner as in Example 1. Thereafter, the battery was stood still in the container shown in FIG. 1 without placing the electrolyte 2 in the container, and the battery voltage and the battery temperature were measured. In Comparative Example 3, no change in the battery voltage and the battery temperature due to occurrence of the internal short circuit was observed. The results are shown in Table 1 below.

Comparative Example 4

In manufacturing of the battery (K1), the positive electrode plate and the negative electrode plate were spirally wound, with a porous resin film made of polyethylene interposed between the electrode plates, thereby producing an electrode group. Then, conductive foreign matter (copper wire having a diameter of 100 μm and a length of 5 mm) was incorporated into the electrode group. Thereafter, a battery was fabricated in the same manner as in Example 1. That is, the conductive foreign matter was incorporated in the electrode group production step in the manufacturing process of the battery.

In the break-in charge/discharge step, the voltage of this battery did not reach 4.1 V although it was charged for the maximum charge time. In addition, a voltage drop behavior was observed thereafter, and the battery could not be completed owing to initial failure. The results are shown in Table 1 below.

required for occurrence of short circuit and the maximum battery temperature. The reason seems to be that the difference in the dissolution start voltage and the dissolution rate of

TABLE 1

| | Time of incorporation of conductive foreign matter | Battery open circuit voltage (V) | Location of placement of foreign matter | Material of foreign matter | Diameter of foreign matter (μm) | Dissolution start voltage (V) | Time required for occurrence of short circuit (min) | Maximum battery temperature (° C.) |
|---|---|---|---|---|---|---|---|---|
| Ex. 1 | after battery completion | 4.2 | A | copper | 500 | 3.6 | 5 | 125 |
| Ex. 2 | after battery completion | 4.2 | A | copper | 100 | 3.6 | 8 | 105 |
| Ex. 3 | after battery completion | 4.2 | A | copper | 50 | 3.6 | 15 | 105 |
| Ex. 4 | after battery completion | 4.2 | A | zinc | 500 | 3.1 | 5 | 115 |
| Ex. 5 | after battery completion | 4.2 | A | iron | 500 | 3.8 | 15 | 130 |
| Ex. 6 | after battery completion | 4.2 | A | cobalt | 500 | 3.9 | 20 | 115 |
| Ex. 7 | after battery completion | 4.4 | A | nickel | 500 | 4.3 | 12 (hrs) | 135 |
| Ex. 8 | after battery completion | 4.2 | B | copper | 500 | 3.6 | 2 | 50 |
| Ex. 9 | after battery completion | 1.45 | B | copper | 500 | 0.6 | 3 | 55 |
| Ex. 10 | after battery completion | 3.25 | C | copper | 500 | 3.6 | 2 | 70 |
| Com. Ex. 1 | after battery completion | 4.2 | A | stainless steel | 500 | insoluble at 5 v | not short circuited | |
| Com. Ex. 2 | after battery completion | 4.2 | A | nickel | 500 | 4.3 | not short circuited | |
| Com. Ex 3 | after battery completion and before electrolyte impregnation | 4.2 | A | copper | 100 | 3.6 | not short circuited | |
| Com. Ex. 4 | at the time of electrode group production | 4.2 | A | copper | 100 | 3.6 | initial failure | |

A: between positive electrode current collector-exposed portion and negative electrode material mixture
B: between material mixtures
C: between material mixture and negative electrode As shown in Table 1, in Examples 1 to 8, it was confirmed that an internal short circuit was caused by establishing electrical conduction between the positive electrode plate and the negative electrode plate through the dissolution and deposition reaction of the conductive foreign matter.

Among Examples 1 to 3, the time required for occurrence of the internal short circuit varied depending on the size of the incorporated conductive foreign matter. Therefore, it can be seen that the size of the conductive foreign matter affects the time required for occurrence of short circuit.

Among Examples 1, 5 and 7, there are great differences in the time required for occurrence of short circuit and in the maximum battery temperature. Therefore, it can be seen that the material of the conductive foreign matter affects the time the conductive foreign matter affected the time required for occurrence of short circuit and the maximum battery temperature.

In Example 8, the location of incorporation of the conductive foreign matter was between the positive electrode material mixture and the negative electrode material mixture, and an internal short circuit also occurred in this case. It was observed that the maximum battery temperature (50° C.) was different from that of Example 1 (125° C.). The reason seems to be that, since the internal short circuit occurred in the presence of the positive electrode material mixture and the negative electrode material mixture, the presence of the positive electrode material mixture, which had low electronic conductivity, caused a high short circuit resistance, thus decreasing the short circuit current. As such, it can be seen that the location of incorporation of the conductive foreign matter affects the exothermal behavior.

Among the above-described examples, no internal short circuit occurred in Comparative Examples 1 to 4. The reason seems to be that an internal short circuit could not be caused in Comparative Examples 1 and 2 since the dissolution voltage of the conductive foreign matter was higher than the open circuit voltage of the battery.

In Comparative Example 3, the reason that no internal short circuit occurred seems to be that the conductive foreign matter did not dissolve since the battery into which the conductive foreign matter was incorporated was not immersed in the electrolyte.

In Comparative Example 4, the reason that the initial failure occurred seems to be that the break-in charge/discharge could not be completed since the conductive foreign matter was incorporated during manufacturing of the battery.

Further, as shown in Examples 9 and 10, it can be seen that an internal short circuit can be similarly caused in batteries other than lithium ion secondary batteries.

<Determination of Safety Level>

The safety of the battery (K2) fabricated using the negative electrode plate (N2) in Example 1 was evaluated in the same manner as in Example 1. As a result, although the time required for occurrence of short circuit was 5 minutes, the maximum battery temperature was about 55° C. The safety of the battery (K2) against the internal short circuit was improved since the ceramic porous film was used for the surface of the negative electrode. The reason is that, even if an internal short circuit has occurred, the short circuit point is burnt out immediately owing to the presence of the heat-resistant insulating film, thus restoring the insulating state. For this reason, almost no Joule heat resulting from the short circuit current is generated at the short circuit point, so that the safety of the battery was significantly improved.

As described above, with the evaluation method of the present invention, it is possible to clearly know the safety level of batteries at the time of occurrence of an internal short circuit. The determined safety level was indicated such that it can be utilized, for example, for deciding the optimum purpose of use of batteries or for designing the application software of the devices that use batteries. For example, it is conceivable to provide the following indication on batteries, battery packs or catalogs specifying the characteristics of batteries.

Indication Example 1

"Internal short circuit 45° C.—copper 500 µm diameter 125° C."

Indication Example 2

"Internal short circuit 45° C.—copper 500 µm diameter 55° C."

The indication of the safety level is not limited to the above-described representation, and there are various forms of indication. In the above-described examples, the test conditions and results are directly represented by characters and numbers. Other than this, it is possible to indicate the safety level by using symbols, characters and the like in compliance with a prescribed standard.

Although the present invention has been described above by way of embodiments and examples, the invention may be subjected to various modifications. For example, when evaluating the safety using the apparatus shown in FIG. 1, the evaluation may be performed while applying a current from an external device. By doing so, it is possible to evaluate the safety at the time of charging the battery using an external device, and the safety at the time of discharging the battery to a load. Alternatively, a charge reaction in which the battery voltage is caused to reach the dissolution start voltage of the conductive foreign matter by passing a charge current through the battery may be performed simultaneously with the safety evaluation.

With the evaluation method of the present invention, it is possible to accurately evaluate the safety of batteries at the time of occurrence of an internal short circuit due to entrance of conductive foreign matter, which may happen after batteries went onto the market, in particular, entrance of conductive foreign matter into the interior of the electrode group. Accordingly, it is possible to provide highly safe batteries to the market.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An evaluation method for evaluating safety of a battery comprising an electrode group including a positive electrode plate, a negative electrode plate and a separator inserted between said electrode plates, said method comprising the steps of:
    charging said battery to a predetermined voltage;
    incorporating conductive foreign matter into said charged battery such that said conductive foreign matter is in contact with said positive electrode plate, and not in contact with said negative electrode plate;
    immersing said battery into which said conductive foreign matter has been incorporated in an electrolyte to dissolve and deposit said conductive foreign matter, thereby causing an internal short circuit to occur in said battery; and
    evaluating a thermal behavior of said battery in which said internal short circuit has occurred, and outputting results of said evaluation as safety indices.

2. The evaluation method in accordance with claim 1, wherein said conductive foreign matter comprises a metal or an alloy that dissolves in said electrolyte at a potential lower than a positive electrode potential of said battery in an open circuit.

3. The evaluation method in accordance with claim 2, wherein said conductive foreign matter is at least one metal selected from the group consisting of copper, nickel, zinc, iron and cobalt, or an alloy thereof.

4. The evaluation method in accordance with claim 1, wherein one of said output safety indices is a maximum temperature of said battery at the time of occurrence of said internal short circuit.

5. The evaluation method in accordance with claim 1, wherein one of said output safety indices is an amount of heat generation in said battery that is caused by said internal short circuit.

6. The evaluation method in accordance with claim 1, wherein one of said output safety indices is a time required from start of dissolution of said conductive foreign matter in said electrolyte until occurrence of said internal short circuit.

7. A battery that has been manufactured by the same steps as those used for manufacturing a battery whose safety indices have been determined with the evaluation method in accordance with claim 1.

8. An evaluation apparatus for evaluating safety of a battery comprising an electrode group including a positive electrode plate, a negative electrode plate and a separator inserted between said electrode plates, said apparatus comprising:
- a container for holding an electrolyte for immersing said battery that has been charged to a predetermined voltage and into which conductive foreign matter has been incorporated such that said conductive foreign matter is in contact with said positive electrode plate, and not in contact with said negative electrode plate;
- a dissolution start time determination means for determining a time at which said conductive foreign matter incorporated into said battery started to dissolve in said electrolyte;
- a short circuit occurrence detection means for detecting occurrence of an internal short circuit in said battery;
- a short circuit occurrence time computation means for computing a time required from start of dissolution of said conductive foreign matter in said electrolyte until occurrence of said internal short circuit, based on a determination result of said dissolution start time determination means and a detection result of said short circuit occurrence detection means;
- a heat generation level detection means for detecting a level of heat generation in said battery that is caused by said internal short circuit; and
- a safety index output means for outputting a computation result of said short circuit occurrence time computation means and a detection result of said heat generation level detection means as safety indices.

9. The evaluation apparatus in accordance with claim 8, wherein said short circuit occurrence detection means detects a voltage change in said battery that is caused by occurrence of said internal short circuit, thereby detecting occurrence of said internal short circuit.

10. The evaluation apparatus in accordance with claim 8, wherein said heat generation level detection means detects a maximum temperature of said battery at the time of occurrence of said internal short circuit as said level of heat generation.

11. The evaluation apparatus in accordance with claim 8, wherein said heat generation level detection means detects an amount of heat generation in said battery that is caused by said internal short circuit as said level of heat generation.

12. A battery that has been manufactured by the same steps as those used for manufacturing a battery whose safety indices have been determined with the evaluation apparatus in accordance with claim 8.

* * * * *